United States Patent
Barnett, Sr.

(10) Patent No.: US 6,481,380 B1
(45) Date of Patent: Nov. 19, 2002

(54) METHOD AND APPARATUS FOR INCREASING EGG PRODUCTION

(76) Inventor: Larry L. Barnett, Sr., 250 Dalan Dr., Batesville, AR (US) 72501

( * ) Notice: Subject to any disclaimer, the term of this patent is extended or adjusted under 35 U.S.C. 154(b) by 0 days.

(21) Appl. No.: 09/817,908

(22) Filed: Mar. 26, 2001

(51) Int. Cl.$^7$ .................................................. A01K 1/00
(52) U.S. Cl. ....................... 119/437; 119/417; 119/448
(58) Field of Search ................................ 119/417, 437, 119/448; 454/238

(56) References Cited

U.S. PATENT DOCUMENTS

| | | |
|---|---|---|
| 3,540,292 A | 11/1970 | Darbo |
| 3,951,336 A | 4/1976 | Miller |
| 4,043,256 A | 8/1977 | Van Huis |
| 4,625,728 A | 12/1986 | Schonberg |
| 4,700,887 A | 10/1987 | Timmons |
| 4,862,829 A | 9/1989 | Laurent et al. |
| 4,862,950 A | 9/1989 | Gribble et al. |
| 5,247,901 A * | 9/1993 | Landon et al. ............... 119/417 |
| 5,336,131 A | 8/1994 | Crider et al. |
| 5,407,129 A | 4/1995 | Carey et al. |
| 5,566,644 A * | 10/1996 | Beery .......................... 119/448 |
| 5,676,596 A * | 10/1997 | Masek .......................... 119/448 |
| 5,813,599 A | 9/1998 | Hoff |
| 5,820,456 A | 10/1998 | Nelson |
| 5,860,388 A | 1/1999 | Tan et al. |
| 5,924,924 A | 7/1999 | Richardson |
| 5,989,119 A | 11/1999 | Raisanen |
| 6,000,170 A | 12/1999 | Davis |
| 6,321,687 B1 * | 11/2001 | Lemmon et al. ............ 119/448 |

* cited by examiner

Primary Examiner—Harold Joyce
(74) Attorney, Agent, or Firm—William J. Sapone; Coleman Sudol Sapone, P.C.

(57) ABSTRACT

A method and apparatus are used to maintain a relatively constant, preferably positive, pressure in a poultry house which houses egg laying poultry, the constant pressure resulting in an increase in egg production while assuring adequate ventilation in the building.

16 Claims, 3 Drawing Sheets

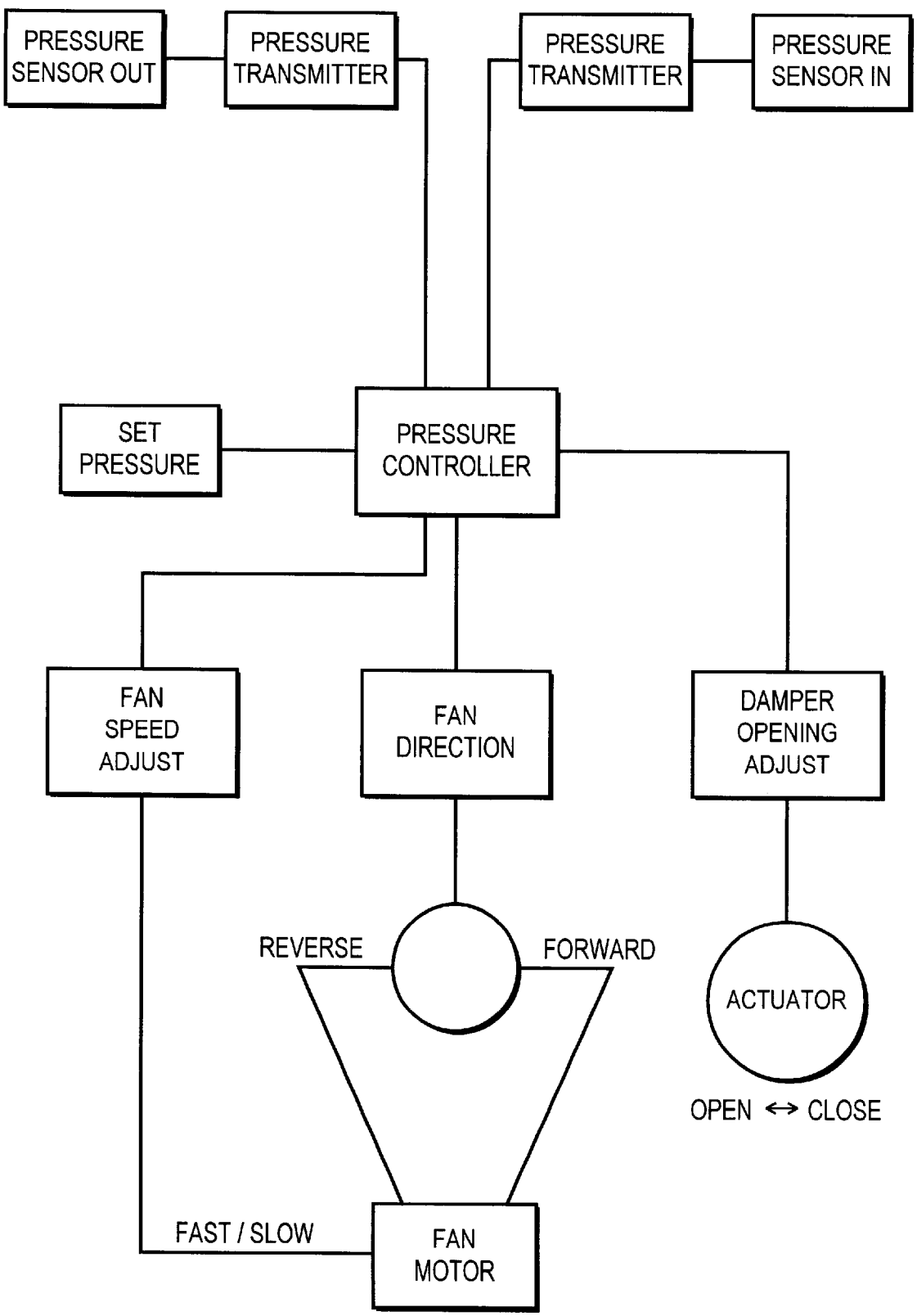
F I G. 2

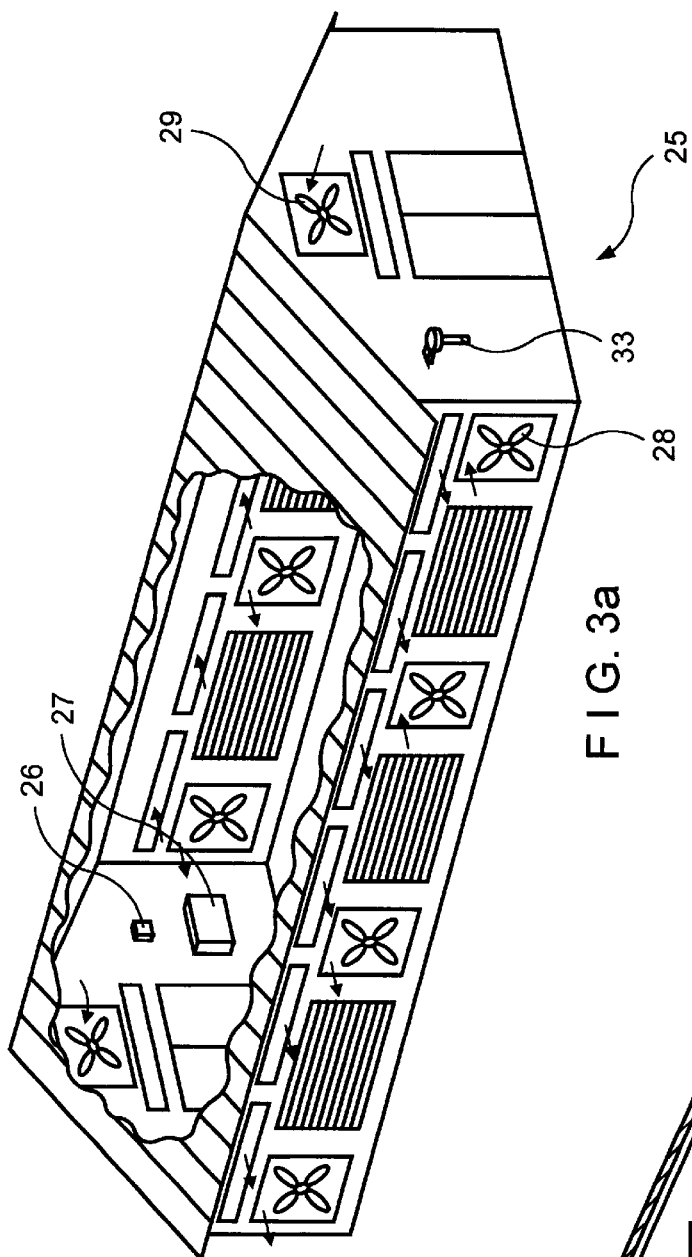
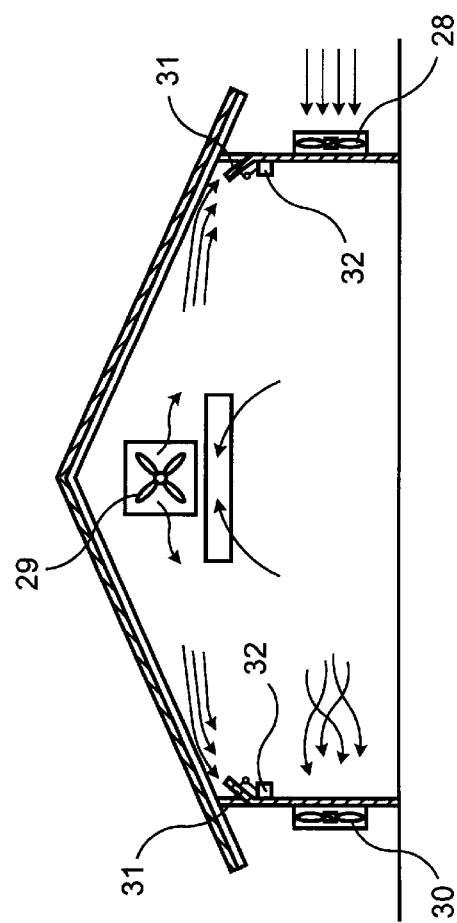
FIG. 3a
FIG. 3b

METHOD AND APPARATUS FOR INCREASING EGG PRODUCTION

TECHNICAL FIELD

This invention relates to poultry houses and more particularly to a method and apparatus for controlling a pressure in a poultry house to increase egg production.

BACKGROUND

The demand for poultry eggs has grown considerably. Poultry eggs are primarily obtained in a large scale manufacturing process that utilizes large buildings known typically as poultry houses. These are generally rectangular in shape and have a plurality of openings used in conjunction with fans or blowers, with various damper arrangements, to provide ventilation.

In U.S. Pat. No. 3,951,336, a typical ventilation system for livestock is described where air is drawn from the building by fans to maintain a slightly less than atmospheric pressure in the building. It is considered important to utilize this slight negative differential pressure to assure an adequate fresh air supply into the building, to preserve the health of the poultry. A certain air turnover rate is desired to avoid build up of moisture or respiration by products as well as to cool or heat the building.

In U.S. Pat. No. 5,336,131, a differential pressure control system for a livestock house is described. This uses a microcomputer based system with various sensors for controlling the air flow through a livestock house, taking into account factors such as outside air temperature, outside air pressure, inside air pressure, etc. The system, while comprehensive, is designed to maintain a programmed negative differential pressure in the building, and is simply directed to more closely controlling the factors which influence the temperature in the building.

SUMMARY OF THE INVENTION

While temperature, humidity and the presence of fresh air are known to affect egg production, it has not been known that egg production could be increased by increasing, as opposed to decreasing, the pressure within a poultry house. This aspect of egg production was discovered by the applicant.

Consequently, it is an object of the present invention to provide a method for increasing egg production by using an air pressure control system to obtain a steady air pressure in a poultry house, independent of ambient pressure variations, and preferably to provide a relatively constant positive pressure differential in a poultry house.

It is a further object of the present invention to provide a poultry house having means to provide a relatively constant positive pressure above atmospheric to increase egg production.

It is yet another object to provide a system for providing a stable atmospheric pressure in a poultry house.

These and other objects of the present invention are achieved by a method comprising the steps of providing a poultry house for housing egg laying poultry, providing means for ventilating the poultry house and providing means for controlling the pressure in a poultry house so as to maintain a relatively constant pressure independent of variations in an ambient atmospheric pressure, such that egg production is increased.

It is well known that the ambient atmospheric pressure is quite variable due to weather changes, season changes, and even from morning to night. Most existing ventilation systems generally mirror these atmospheric pressure changes. This variability is believed to be a negative influence on egg production which is resolved by the present invention.

According to the invention, the poultry house for the most part can be of conventional construction except for the ventilation system. In a change from the prior art, fans or blowers are used to blow in fresh air, with exhaust air means being used to restrict the exhaust air discharge in an amount sufficient to achieve a positive building pressure. While positive pressure is not essential, it provides ease in achieving the relatively constant pressure needed to increase egg production. Systems which rely on negative pressure in a poultry house are much more sensitive to ambient pressure changes than a system maintained at a positive pressure. A positive pressure increase can be controlled by controlling fan or blower speed, in combination with fixed discharge openings, with the control used to avoid over-pressurization of the building. On the other hand, fixed blower speeds with control means used to control exhaust air dampers or exhaust air fans may be provided to achieve a balance of adequate ventilation through the building with sufficient resistance so as to achieve a positive internal building pressure, which is more easily maintained relatively constant relative to outside atmospheric pressure changes. In accordance with the invention, adequate ventilation is still accomplished as fresh air is still supplied to the poultry house as exhaust air is removed, the pressure control system designed to assure a degree of positive pressure in the building in combination with the desired house ventilation scheme.

By providing a relatively constant pressure of from about 30.0 to about 31 inches of water, surprisingly it is believed that egg production may be increased from about 1 to about 5%. In a large poultry house, on an annual basis, this can result in a substantial increase in revenue.

As most poultry houses have negative pressure type ventilation systems in place, the invention can be readily incorporated by modification of the existing ventilation system and therefore retrofitting to existing poultry houses is possible, with the cost offset by the increased egg production.

For optimum performance, new poultry houses can be designed to incorporate features which enhance the ability to maintain a relatively constant positive pressure, reducing leakage so as to provide better overall environmental control, as will be discussed in more detail below.

BRIEF DESCRIPTION OF THE DRAWINGS

FIG. 2 is a block diagram showing a control system useful with the present invention.

FIG. 3a is a poultry house retrofitted so as to practice the method of the present invention, and FIG. 3b is a cross-section thereof.

DETAILED DESCRIPTION OF THE INVENTION

Figure 1:
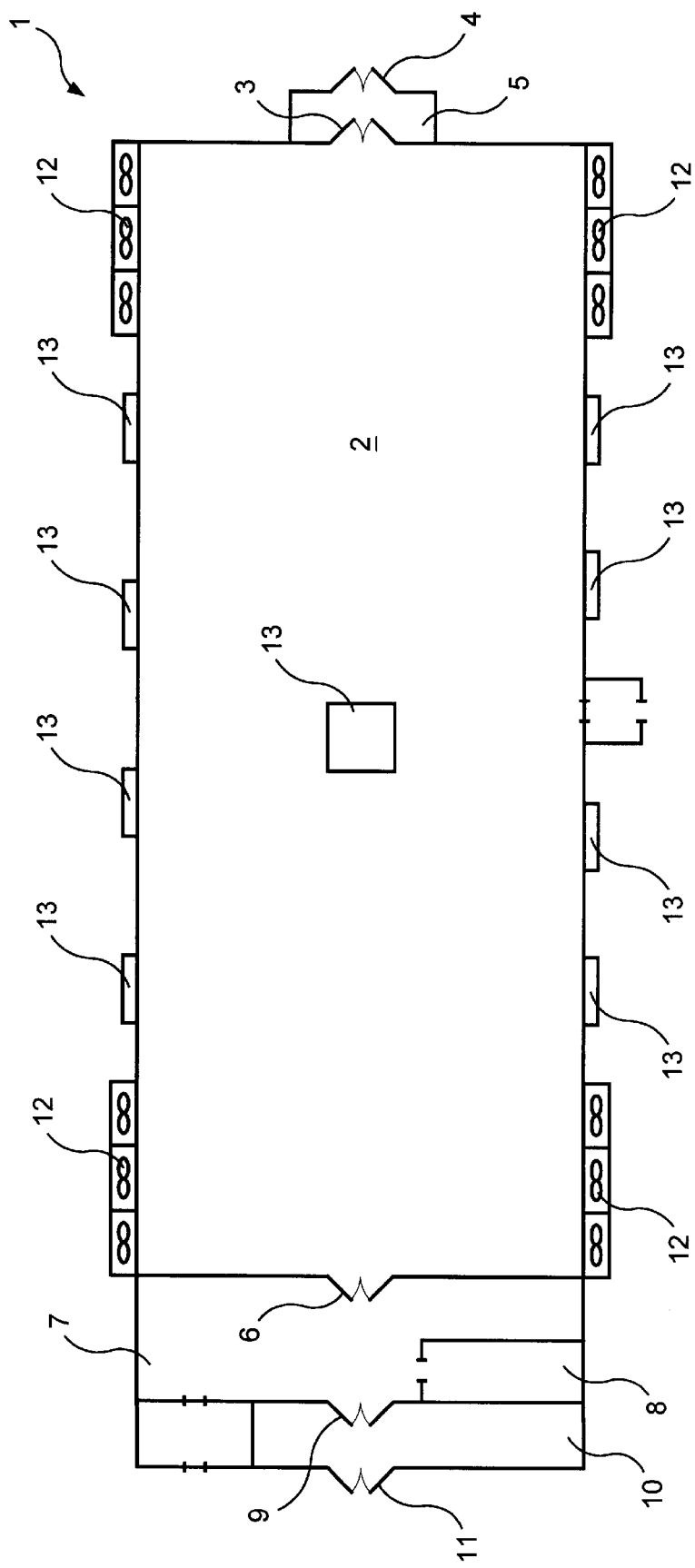
FIG. 1 is a poultry house incorporating the system of the invention.

Referring to FIG. 1, a poultry house having means for maintaining a relatively constant internal pressure relative to fluctuations in the ambient outside air pressure is shown. The poultry house (1) has a plurality of fans (2) which are part of the air ventilation system. A plurality of vent openings (3) are distributed about the building, for the discharge of exhaust air therethrough. A pressure sensor (4) is locate outside the building for reference. A second pressure sensor (5) is placed in an interior of the building and is connected to a pressure transmitter (6) that outputs a pressure signal to a controller (7). The controller (7) receives the pressure signal and then compares it to a preselected set constant pressure, typically determined by an operator. The set pressure should be slightly above a typical range of ambient atmospheric pressure variations, as this is the easiest scenario for achieving a constant internal pressure. The range could be from about 30.0 to about 3.1.0 with about 30.5 preferred. Relatively constant internal pressure means that the pressure is close to the set point approximately 75% of the time or more. Fluctuations are inevitable when doors open or other events occur, though the system should be designed with sufficient capacity to limit the excursions in time as well as in the degree of difference from the set point. Generally, a fluctuation of about +/−0.2 inches of water is acceptable.

The controller calculates the difference between the set pressure and the actual internal pressure and determines whether the internal pressure is too high or too low. From this determination, the controller sends a control signal for adjusting the pressure in the poultry house. In one embodiment of the invention, this involves opening the dampers to decrease internal pressure (letting more air out of the building) or closing the dampers (keeping more air in the building) to increase pressure. To the extent possible, a relatively constant positive pressure should be maintained.

Alternately, the fan speed control could be adjusted to increase or decrease the amount of air supplied to the building, with a corresponding increase or decrease in internal pressure.

In a preferred embodiment of the invention, one or more of the fans are reversible and therefore can be used to either supply air into the building or be used as exhaust fans. In this way, not only can the pressure in the building be controlled, but adequate ventilation through the building assured. In addition, by altering which fans blow into the building and those which blow out, changes can be made to accommodate differences in the season. For example, during colder weather, air could be supplied through the fans at a top of the building so that there is some mixing with the warmer internal air near the roof to temper the cold air before it reaches the poultry. During warmer weather, the higher elevation fans are used as exhaust fans to assure that the hottest air is removed from the building. Efficient ventilation and temperature control can then be achieved, as well as an increase in egg production. By simply having more fans supplying air than the number removing air, the positive pressure can be obtained, and for additional control, dampers can be utilized in combination with the fans to assure both that the positive pressure is maintained and that adequate ventilation is assured.

Referring to FIG. 1, a building 1 has poultry housing portion 2 accessible through first and second double entry doors, 3 and 4, respectively with a space 5 therebetween. This forms an air-lock to limit the loss in positive pressure as doors are opened by operators, etc. This also assists in climate control, preventing a rush of cold or hot air into the building as one set of doors usually closes before the other doors open.

Cooling and heating can be provided by any conventional means such as using earth tubes for cooling, or propane heaters for heating, and the invention is not limited by the choice of temperature control system.

The building 1 has another entry 6 leading to a packing area 7, with an egg cooler 8. Doors 9 lead to a shipping/receiving area 10 and doors 11 exit the building, the series of doors providing an air-lock for pressure maintenance.

The building 1 has a plurality of fans 12 distributed about the building, as well as a plurality of actuated damper openings 13 which work in a coordinated effort to maintain a relatively constant internal air pressure as will be described below.

Referring to FIG. 2, a block diagram of the control scheme is shown indicating the elements usable for controlling the interior pressure of a poultry house. A pressure controller 14 receives a signal from a pressure transmitter 15 and a sensor 16 located within the building 2. One or more sensors and transmitters may be used. The pressure controller may optionally receive a signal from an outside pressure sensor 17 and pressure transmitter 18. This can be used by an operator for reference, and it may be useful to record the outside pressure relative to the inside pressure to confirm that the pressure within the poultry house is relatively constant compared to the outside pressure. If not, this may indicate that a door is open or that there is some other problem with the system that should be checked by the operator. This may also be used to review egg production relative to building pressure over a given time period.

The pressure controller is given a set point 19 by the operator, that is, the target pressure to maintain in the building. The pressure controller then compares the set point to the actual internal pressure and issues a control signal that may be sent to a damper adjusting device 20 which controls a damper actuator 21, and/or a fan direction controller 22 and/or a fan speed adjustment device 23 which control the fan motors 24. Any one or a combination of these may be used to change the internal pressure to bring it closer to the set pressure. Again, opening the damper reduces the pressure, closing the damper increases the pressure, etc. Another option is to selectively turn on or off various fans, though this does not provide very fine pressure control. Preferably, pressure is controlled by adjusting the damper openings, as this is the easiest and cheapest way to implement the system, and cost is a concern in egg production.

Referring to FIG. 3a, an existing type of poultry house 25 is shown which can be retrofitted for utilizing the present invention. In this embodiment, the air lock type of double doors are not included, but these could optionally be added. The first step in the retrofitting is to reverse some of the plurality of fans either physically or via control means so that some fans blow air into the structure as opposed to all the fans withdrawing air from the structure. A pressure sensor and transmitter 26 are mounted in the building and connected to a controller 27, which as described previously is used to maintain a relatively constant internal pressure. As shown in FIG. 3b, the fans 28 and 29 blow air into the building while a fan 30 and dampers 31 allow air to exit the building. Thus, several fans continue to be used as exhaust fans, and the existing dampers are used but have actuators 32 responsive to control signals which assure that a relatively constant pressure is maintained as opposed to the negative pressure utilized in the prior art. An a outside pressure sensor/transmitter 33 provides a reference signal to the controller.

By maintaining a relatively constant internal air pressure, it is believed that egg production can be increased by about 2–5%. While it is not completely understood as to why the control of air pressure promotes egg production, it is believed that the variations in atmospheric pressure may disturb the poultry while a constant slightly positive pressure may have a calming effect on the poultry. It is known that a calming effect can result in an increase in egg production.

Utilizing the present invention thus promotes and increases the yield in egg production while at the same time providing additional opportunities for better control of the environment in a poultry house. Even when utilizing a positive building pressure, the poultry house is assured of receiving adequate intake of fresh air so as to prevent a buildup of heat, moisture and fumes which could have a detrimental impact on egg production.

While preferred embodiments of the present invention have been shown and described, it will be understood by those skilled in the art that various changes or modifications could be made without varying from the scope of the present invention.

What is claimed is:

1. A method for increasing egg production in a poultry house comprising the steps of:

providing a poultry house for housing egg laying poultry;

providing means for ventilating the poultry house;

providing means for sensing a pressure in the poultry house;

providing means for controlling the pressure in the poultry house to maintain a relatively constant pressure in the poultry house; and, controlling the pressure in the poultry house to maintain a relatively constant pressure independent of outside pressure variations, such that egg production is increased.

2. The method of claim 1 further comprising providing the poultry house with air mover means to deliver air into the poultry house.

3. The method of claim 1 wherein the poultry house has means for adjusting the flow of air exiting the poultry house.

4. The method of claim 1 wherein the poultry house has a plurality of fans for delivering air into the poultry house.

5. The method of claim 1 wherein the poultry house has a plurality of dampers for adjusting the discharge of air from the building.

6. The method of claim 1 wherein the poultry house has a plurality of fans for delivering air into the poultry house and a plurality of fans for discharging exhaust air from the poultry house.

7. A poultry house for containing a plurality of egg laying poultry comprising a building, means for delivering air into the building, means for exhausting air from the building, means for sensing inside pressure in the building, and control means for receiving a signal from the sensing means and, means for adjusting the air delivered to and discharged from the building, the control means acting with the adjusting means for maintaining a relatively constant pressure independent of outside pressure variations in the building.

8. The poultry house of claim 7 wherein the poultry house has air mover means to deliver air into the poultry house.

9. The poultry house of claim 7 wherein the poultry house means for adjusting the flow of air exiting the poultry house.

10. The poultry house of claim 7 wherein the poultry house has a plurality of fans for delivering air into the poultry house.

11. The poultry house of claim 7 wherein the poultry house has a plurality of dampers for adjusting the discharge of air from the building.

12. The poultry house of claim 7 wherein the pressure is maintained at a relatively constant pressure from the range of about 30.0 to about 31.0 inches of water.

13. The poultry house of claim 7 wherein the pressure in the poultry house is maintained at a positive pressure relative to the ambient atmospheric pressure.

14. The poultry house of claim 7 wherein the pressure in the poultry house has a relatively constant pressure selected from the range of about 30.0–31.0 inches of water, which varies therefrom by about +/−0.2 inches of water.

15. The poultry house of claim 7 wherein the poultry house has a plurality of fans for delivering air into the poultry house and a plurality of fans for discharging exhaust air from the poultry house.

16. The poultry house of claim 7 wherein the control means maintains a positive pressure in the building of about 30.5 inches of water, +/−0.2 inches, approximately 75% of the time.

\* \* \* \* \*